United States Patent
Park et al.

(10) Patent No.: US 9,584,955 B2
(45) Date of Patent: Feb. 28, 2017

(54) METHOD FOR PROCESSING DATA RECEIVED AND AN ELECTRONIC DEVICE THEREOF

(71) Applicant: Samsung Electronics Co., Ltd., Gyeonggi-do (KR)

(72) Inventors: Ji-Hyun Park, Gyeonggi-do (KR); Hyun-Soo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/615,279

(22) Filed: Feb. 5, 2015

(65) Prior Publication Data
US 2015/0223013 A1    Aug. 6, 2015

(30) Foreign Application Priority Data
Feb. 5, 2014 (KR) .................. 10-2014-0013265

(51) Int. Cl.
*H04W 4/00* (2009.01)
*H04W 4/02* (2009.01)
*H04W 8/02* (2009.01)
*H04L 29/08* (2006.01)

(52) U.S. Cl.
CPC ............ *H04W 4/008* (2013.01); *H04L 67/18* (2013.01); *H04W 4/023* (2013.01); *H04W 8/02* (2013.01)

(58) Field of Classification Search
CPC ... H04M 1/7253; H04W 88/06; H04W 4/008; H04W 4/023; H04L 67/18
See application file for complete search history.

(56) References Cited

U.S. PATENT DOCUMENTS

| | | | |
|---|---|---|---|
| 7,853,207 B2 | 12/2010 | Harada et al. | |
| 8,761,668 B2 | 6/2014 | Park | |
| 2006/0229014 A1 | 10/2006 | Harada et al. | |
| 2007/0129012 A1 | 6/2007 | Snow | |
| 2009/0093214 A1 | 4/2009 | Park | |
| 2013/0138741 A1 | 5/2013 | Redstone et al. | |

FOREIGN PATENT DOCUMENTS

| | | |
|---|---|---|
| EP | 2547044 A2 | 1/2013 |
| KR | 10-2012-0127968 | 11/2012 |
| KR | 10-2013-0006731 | 1/2013 |

OTHER PUBLICATIONS

Extended European Search Report, dated Aug. 28, 2015, in connection with European Application No. 15153796.6, 11 pages.
European Examination Report, dated Jul. 22, 2016, in connection with European Application No. 15153796.6, 9 pages.

*Primary Examiner* — Lewis West

(57) ABSTRACT

A method for operating a first electronic device is provided. The method includes receiving data from a second electronic device in short-range radio communication. The method also includes detecting a location of the first electronic device. The method further includes determining an execution method of the received data based on at least one of the location of the electronic device and one or more of communication region information of the short-range radio communication of the second electronic device, signal strength of the short-range radio communication in the communication region, and location information of the electronic device.

20 Claims, 14 Drawing Sheets

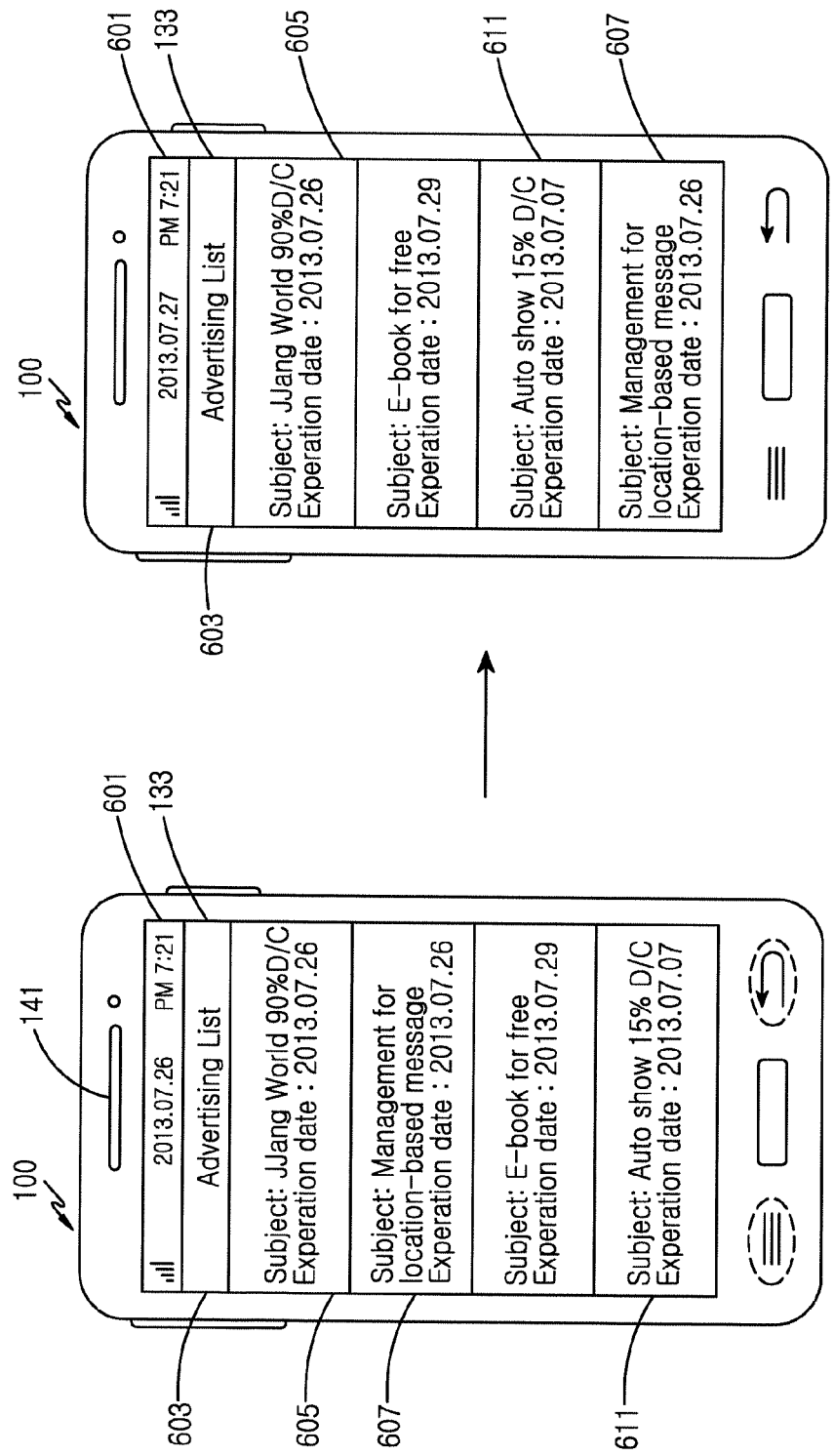

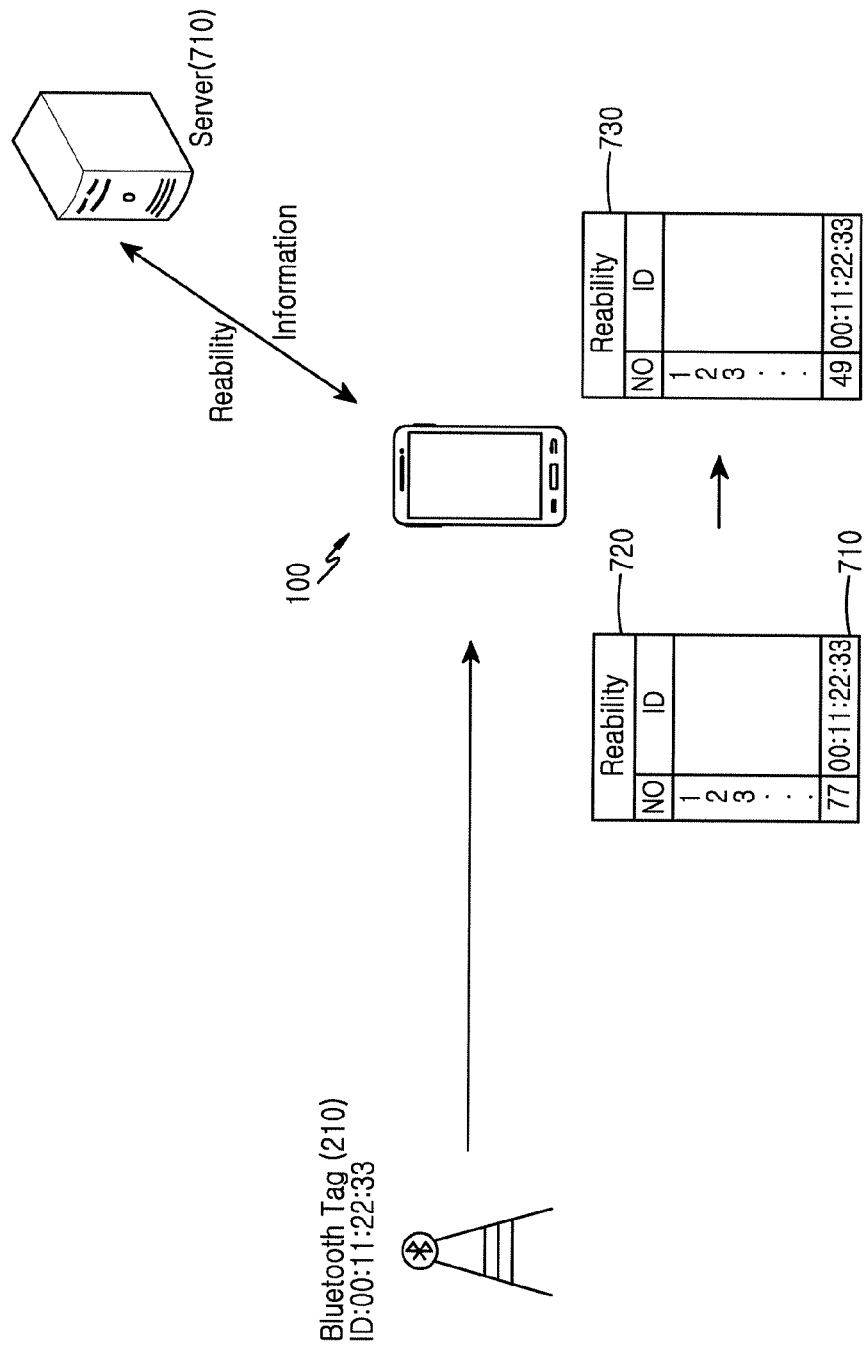

METHOD FOR PROCESSING DATA RECEIVED AND AN ELECTRONIC DEVICE THEREOF

PRIORITY

The present application is related to and claims priority under 35 U.S.C. §119 to an application number 10-2014-0013265 filed in the Korean Intellectual Property Office on Feb. 5, 2014, the contents of which are incorporated herein by reference.

TECHNICAL FIELD

The present disclosure relates generally to an electronic device. More particularly, the present disclosure relates to a method and an electronic device for processing data received in short-range radio communication.

BACKGROUND

As multimedia technology and circuit integration technology advance, an electronic device for using various multimedia functions are getting smaller and becomes one of personal necessities. Further, as the electronic device provides a voice communication function using mobile communications and various additional services such as data communication over Internet, video play, audio play, messenger, schedule management, and alarm function, various programs are used for those functions and various input methods are used to use programs installed in the electronic device. Recently, as short-range radio communication technology of the electronic device notably grows, a method for controlling the electronic device using the radio communication is provided.

SUMMARY

To address the above-discussed deficiencies of the prior art, it is a primary aspect of the present disclosure to provide a method and an electronic device for processing data received in short-range radio communication. Another aspect of the present disclosure is to provide a method and an electronic device for synchronizing or updating data received.

In a first example, a method to operate a first electronic device is provided. The method includes receiving data from a second electronic device in short-range radio communication. The method also includes detecting a location of the first electronic device. The method further includes determining an execution method of the received data based on the location of the electronic device and one or more of communication region information of the short-range radio communication of the second electronic device, signal strength of the short-range radio communication in the communication region, and location information of the electronic device.

In a second example, a first electronic device is provided. The first electronic device includes a display to display one or more data. The first electronic device also includes a memory for storing the data. The first electronic device further includes one or more processors configured to receive data from a second electronic device in short-range radio communication, detect a location of the first electronic device, and determine an execution method of the received data based on the location of the electronic device and one or more of communication region information of the short-range radio communication of the second electronic device, signal strength of the short-range radio communication in the communication region, and location information of the electronic device.

Other aspects, advantages, and salient features of this disclosure will become apparent to those skilled in the art from the following detailed description, which, taken in conjunction with the annexed drawings, discloses exemplary embodiments of the disclosure.

Before undertaking the DETAILED DESCRIPTION below, it be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device be implemented in hardware, firmware or software, or some combination of at least two of the same. It should be noted that the functionality associated with any particular controller be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrates an example data information operation in the electronic device according to this disclosure;

FIGS. 7A and 7B illustrates example operations for determining a priority of the data information in the electronic device according to this disclosure;

Throughout the drawings, like reference numerals will be understood to refer to like parts, components and structures.

DETAILED DESCRIPTION

Figure 1:
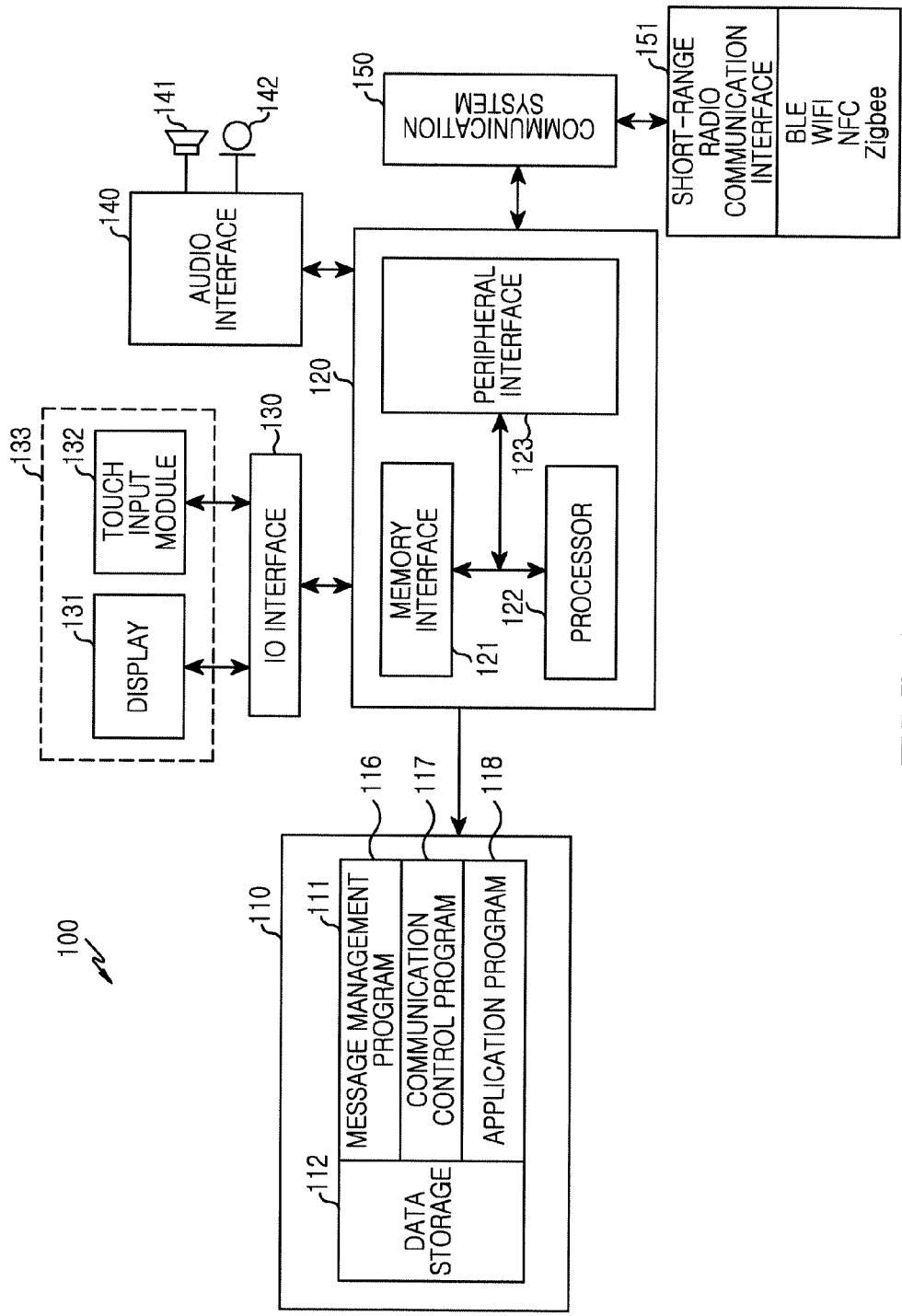
FIG. 1 illustrates an example electronic device according to this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein are made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, occurs in amounts that do not preclude the effect the characteristic was intended to provide.

Herein, an electronic device is explained based on a touch screen which conducts an input operation through an input device and a display operation through a display on a physical single screen. While the display and the input device are separated, the display includes the input device and the input device is referred to as the display.

The present disclosure is not limited to the electronic device including the touch screen, but is applicable to various electronic devices including the display and the input device physically separated, or including either the display or the input device. Hereinafter, the touch screen includes a touch input module and a display, or the display may not include the touch input module. And the electronic device includes the display including the input device.

Hereinafter, an electronic device 100 embraces a mobile communication user equipment, a Personal Digital Assistant (PDA), a Personal Computer (PC) laptop, a smart phone, a smart Television (TV), a netbook, a Mobile Internet Device (MID), an Ultra Mobile PC (UMPC), a tablet PC, a mobile pad, a media player, a handheld computer, a navigation, a smart watch, a Head Mounted Device (HMD), and an MP3 player.

It will be understood that when an element is simply referred to as being 'connected to' or 'contacted to' another element in the present disclosure, it is 'directly connected to' or 'directly contacted to' another element or be connected to or coupled to another element, having the one or more other elements intervening there between. When an element is referred to as being 'directly connected to' or 'directly contacted to' another element, another element intervening is not present there between.

FIG. 1 is a block diagram of an example electronic device according to this disclosure. As shown in FIG. 1, the electronic device 100 includes a memory 110 and a processor unit 120. The electronic device 100 includes, as peripherals, an Input Output (IO) processor 130, a display 131, an input device 132, an IO interface audio interface 140, a communication system 150, and other peripherals.

The memory 110 includes a program storage 111 for storing a program to control operations of the electronic device 100, and a data storage 112 for storing data generating in the program execution. The memory 110 stores data generated by the program in a processor 122. For example, the data storage 112 configures and stores operation information of the electronic device 100 for controlling other electronic device, in a database in the form of a table or a list.

The data storage 112 configures and store a list of one or more other electronic devices authorized to control the electronic device 100 in the database of a table or a list. The data storage 112 configures and stores an approved control operation of other electronic device for each electronic device of the authorized electronic device list, in the database of a table or a list. The program storage 111 includes a message management program 116, a communication control program 117, and at least one application program. The programs contained in the program storage 111 are referred as an instruction set which is a set of instructions. The application program 118 includes a software component for at least one application program installed in the memory 110 of the electronic device 100.

When the electronic device 100 generates data (such as packet data), the message management program 116 includes at least one of identification information of the electronic device 100 sending the data, one or more event information, and control information (operation control information) requesting to control one or more functions of other electronic device. Hereafter, the present disclosure selects, but not limited to, one of the identification information received at the electronic device 100, the one or more event information, and the control information (operation control information) requesting to control one or more functions of other electronic device, or explain the above-stated data. It is noted that the present disclosure is applied to the data or the identification information of the data, the one or more event information, and the control information (operation control information) requesting to control one or more functions of other electronic device.

When receiving data (such as packet data) from other electronic device through the short-range radio communication, the message management program 116 obtains the identification information of the other electronic device, the one or more event information, and the control information requesting to control some operations of the electronic device 100 in the data (such as packet data).

Based on the database, the message management program 116 determines whether the identification information of the other electronic device, the event information, and the control information obtained from the received data (such as packet data) are approved by the electronic device 100. The message management program 116 displays the event information based on the database, and perform the operation of the electronic device 100 according to a request of the control information. To ease the understanding, while the information in the data received by the electronic device 100 is divided to the event information or the control information, the event information includes the control information.

When displaying the event information or conducting the operation corresponding to the request of the control information in the received data, the message management program 116 determines a distance to the other electronic device sending the data in the short-range radio communication and determine a priority of the operation corresponding to the displayed event information or the request of the control information according to location information of the electronic device 100 and/or the distance information of the other electronic device.

The communication control program 117 includes at least one software component for controlling the communication with at least one other electronic device using the communication system 150 or a short-range radio communication module 151. The communication control program 117 scans the other electronic device to connect the communication. Upon discovering the other electronic device to connect the communication, the communication control program 117 establishes the connection to communicate with the other electronic device. Next, the communication control program 117 controls to send and receive data (such as packet data) to and from the other electronic device through the communication system 150 by performing capability negotiation and session establishment with the connected other electronic device.

The communication control program 117 transmits data (such as packet data) in a preset network group or a preset channel without connecting the communication with the other electronic device. When sending data in a preset network group or a preset channel without connecting the communication with the other electronic device, the electronic device 100 receives data (such as packet data) from the other electronic device which is positioned in the preset network group or the preset channel.

The electronic device 100 includes one or more memories 110. According to a purpose, the memory 110 functions as the program storage 111 and the data storage 112 alone or both. A physical internal area of the memory 110 may not be distinctly divided according to characteristics of the electronic device 100. The processor unit 120 includes a memory interface 121, at least one processor 122, and a peripheral interface 123. Herein, the memory interface 121, the at least one processor 122, and the peripheral interface 123 of the processor unit 120 is integrated onto at least one integrated circuit or implemented using separate components.

The memory interface 121 controls access of the component such as processor 122 or peripheral interface 123, to the memory 110. The peripheral interface 123 controls connections between an IO peripheral of the electronic device 100 and the processor 122 and the memory interface 121. The processor 122 controls the electronic device 100 to provide various multimedia services using at least one software program, control the display 131 to display User Interface (UI) of the electronic device 100 so as to confirm it through the IO interface 130, and control the touch input module 132 to input a command from the outside of the electronic device 100. The processor 122 executes at least one program stored in the memory 110 and control to provide the service corresponding to the program.

The IO interface 130 provides an interface between an IO device 133 such as display 131 and input device 132, and the peripheral interface 123. The display 131 generates the UI by receiving status information of the electronic device 100, a character input from the outside, a moving picture, and a still picture from the processor unit 120, and display the UI through the IO interface 130. The touch input module 132 provides input data generated by a user's selection to the processor unit 120 through the IO interface 130. For example, the touch input module 132 includes only a control button or a keypad for receiving control data from the outside of the electronic device 100.

The touch input module 132 provides the input and the output to the display 131 and the IO device 133 so that the input and the output operate in the single screen. In this case, the touch input module 132 of the IO device 133 adopts one or more of capacitive, resistive (pressure detection), infrared, electromagnetic inductive and ultrasonic wave techniques.

The input of the touch input module 132 includes the direct touch input on the touch screen 133 and the command input when an input means is located within a certain distance from the touch screen 133, and is referred to as hovering touch, floating touch, indirect touch, proximity touch, or noncontact input. The IO device 133 physically combines the touch input module 132 on the display 132 as the single screen, and adopts a touch screen for inputting the command by touching the screen on the display 131 in the electronic device 100. Since the touch screen serves as both of the display 131 for displaying the UI of the electronic device 100 and the touch input module 132 for inputting the external command to the electronic device 100, the touch screen 133 embraces the display 131 and the touch input module 132. In the present disclosure, the touch screen 133 includes a complex touch panel including a touch panel and a pen touch panel. The touch screen 133 of the electronic device 100 is not limited to the touch screen including the complex touch panel and is also applicable to the touch screen including the pen touch panel allowing only the pen touch.

The IO interface audio interface 140 provides an audio interface between the user and the electronic device 100 through the speaker 141 and a microphone 142. The communication system 150 performs a communication function. For example, the communication system 150 communicates with the other electronic device using one or more of mobile communication via a base station, wired communication, and satellite communication, and perform the short-range radio communication in connection with the short-range radio communication module.

The short-range radio communication module 151 communicates with the other electronic device using at least one of the short-range radio communication such as Infrared Data Association (IrDA) communication, Bluetooth communication, Bluetooth Low Energy (BLE) communication, Wireless Fidelity (Wi-Fi) communication, Near Field Communication (NFC) communication, Zigbee communication, and ANT+ communication, wireless Local Area Network (LAN) communication, and wired communication. While the communication system 150 and the short-range radio communication module 151 are separated, the communication system 150 and the short-range radio communication module 151 performs the communication in a single communication system module.

The term 'displaying' or 'outputting' of the electronic device 100 indicates the operation for displaying the moving picture, the still picture, or the GUI in the touch screen 133 of the electronic device 100 or the operation for outputting a signal sound or a voice through the speaker 141. Hereafter, the term 'displaying' or 'outputting' is used with the same meaning and is separately explained if necessary.

Figure 2:
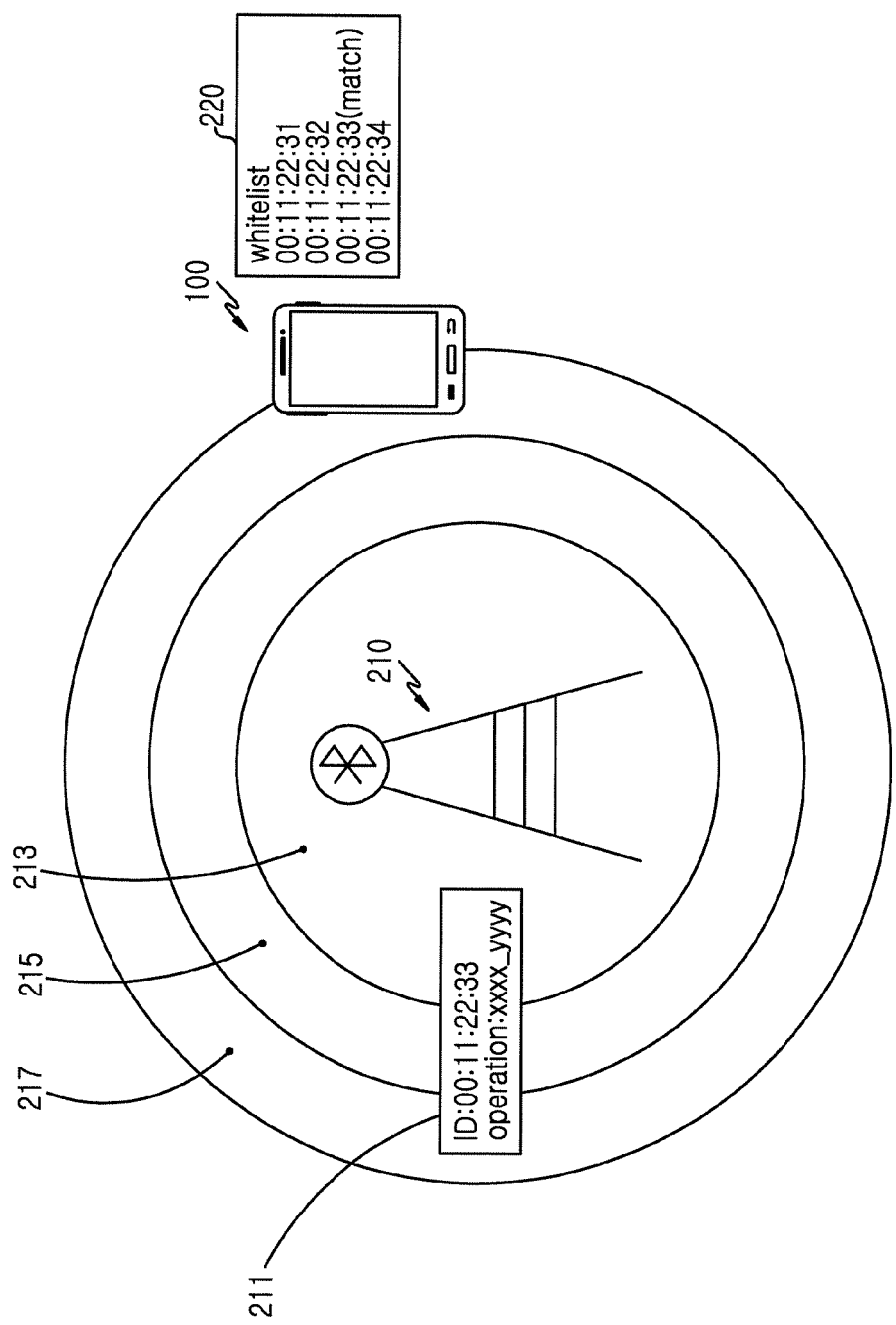
FIG. 2 illustrates an example of data reception in the electronic device according to this disclosure.

FIG. 2 depicts an example of data reception in the electronic device according to this disclosure. The electronic device 100 receives data from a data transmitter 210. The electronic device 100 or the data transmitter 210 which sends the data to the electronic device 100 includes a short-range radio communication device or the short-range radio communication module 151 for transmitting data using one or more of the short-range radio communications such as IrDA communication, Bluetooth communication including the BLE communication, Wi-Fi communication, NFC communication, Zigbee communication, and ANT+ communication. The data transmitter 210 employs a Bluetooth tag device. The data transmitter 210 transmits data using the short-range radio communication at preset time intervals within a data transmission range of the short-range radio communication. To send the data using the Bluetooth, the data transmission range is determined based on Bluetooth communication signal strength. The data transmitter 210 or the electronic device 100 determines the data transmission/reception range (distance), for example, a first range 213, a second range 215, or a third range 217, based on the Bluetooth signal strength. The electronic device 100 determines the distance based on the signal strength of the data transmitter 210, and the determined distance is the relative distance determined by the electronic device 100. The electronic device 100 determines a certain section of the determined distance as the first range 213, the second range 215, or the third range 217.

The data transmitter 210 includes its identification information such as Identification (ID) code in the transmitted data 211, and operation information or event information to be conducted by the receiving device. The data transmitter 210 identifies the electronic device 100 in the data transmission range and sends the data to the electronic device 100. The electronic device 100 compares the received data 211 from the data transmitter 210 with an ID code of the receive data 211 in a whitelist 220 stored in the database. When the whitelist 220 includes the ID code of the received data 211, the electronic device 100 processes the received data 211.

Out of the data transmission rage of the data transmitter 210 (such as when the short-range radio communication with the data transmitter 210 is terminated), the electronic device 100 restricts the data processing based on the ID code of the receive data. For example, when the short-range radio communication is disconnected from the data transmitter 210, the electronic device 100 deletes the received data and stores the data in a separate area of the memory 110. For example, the electronic device 100 functions as the data transmitter 210 to send data to other electronic device connected using the short-range radio communication.

Figure 3:
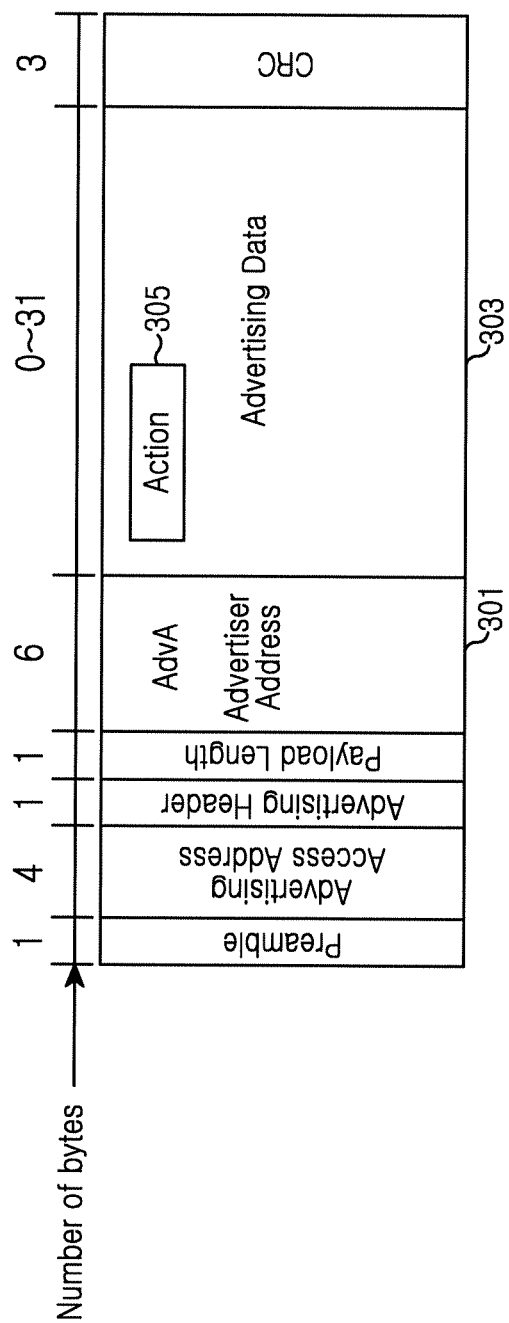
FIG. 3 illustrates an example of data transmitted and received in the electronic device according to this disclosure.

FIG. 3 depicts an example of data transmitted and received in the electronic device according to this disclosure. The data transmitter 210 transmits data (such as a packet data) to the electronic device 100 using the radio communication (such as Bluetooth communication). The data transmitter 210 includes its ID code and the information to be displayed or event information to be executed by the electronic device 100 in the data (such as packet data) and send the data (such as packet data) in the radio communication environment so that the electronic device 100 executes the command in the data (such as packet data). Referring to FIG. 3, the data (such as packet data) used in the radio communication of the data transmitter 210 includes an area including the ID information (such as an ID) and an area including the event information and/or the control information. When the data transmitter 210 sends the data (such as packet data), a 6-byte advertiser address area 301 includes the ID code prearranged with the electronic device 100 receiving the data (such as packet data).

The data transmitter 210 includes the event information or the control information to be processed by the electronic device 100, in a 31-byte advertising data area 303 using the command prearranged with the electronic device 100 receiving the data (such as packet data). The data transmitter 210 includes one or more event information or control information in the advertising data area 303. When the control information exceeds 31 bytes in size, the data transmitter 210 includes the event information or the control information in a plurality of data (such as packet data). The data (such as packet data) includes in a 1-bite type advertising header or payload length area a command indicating that the control information includes the multiple advertising data areas 303. The multiple data (such as packet data) constructs one complete information set. The data transmitter 210 transmits data of the completed information by transmitting the multiple data (such as packet data). The advertising data area 303 stores information in an action area 305 containing the event information to be displayed by the electronic device 100.

The 47-byte data (such as packet data) is not limited to the size of the data (such as packet data) or the area size of the data (such as packet data) in FIG. 3. The data (such as packet data) such as advertiser address 301 or the advertising data 303 is not limited to the construction of FIG. 3 and is applied to various data (such as packet data) used in the radio communication environment.

Figure 4A:
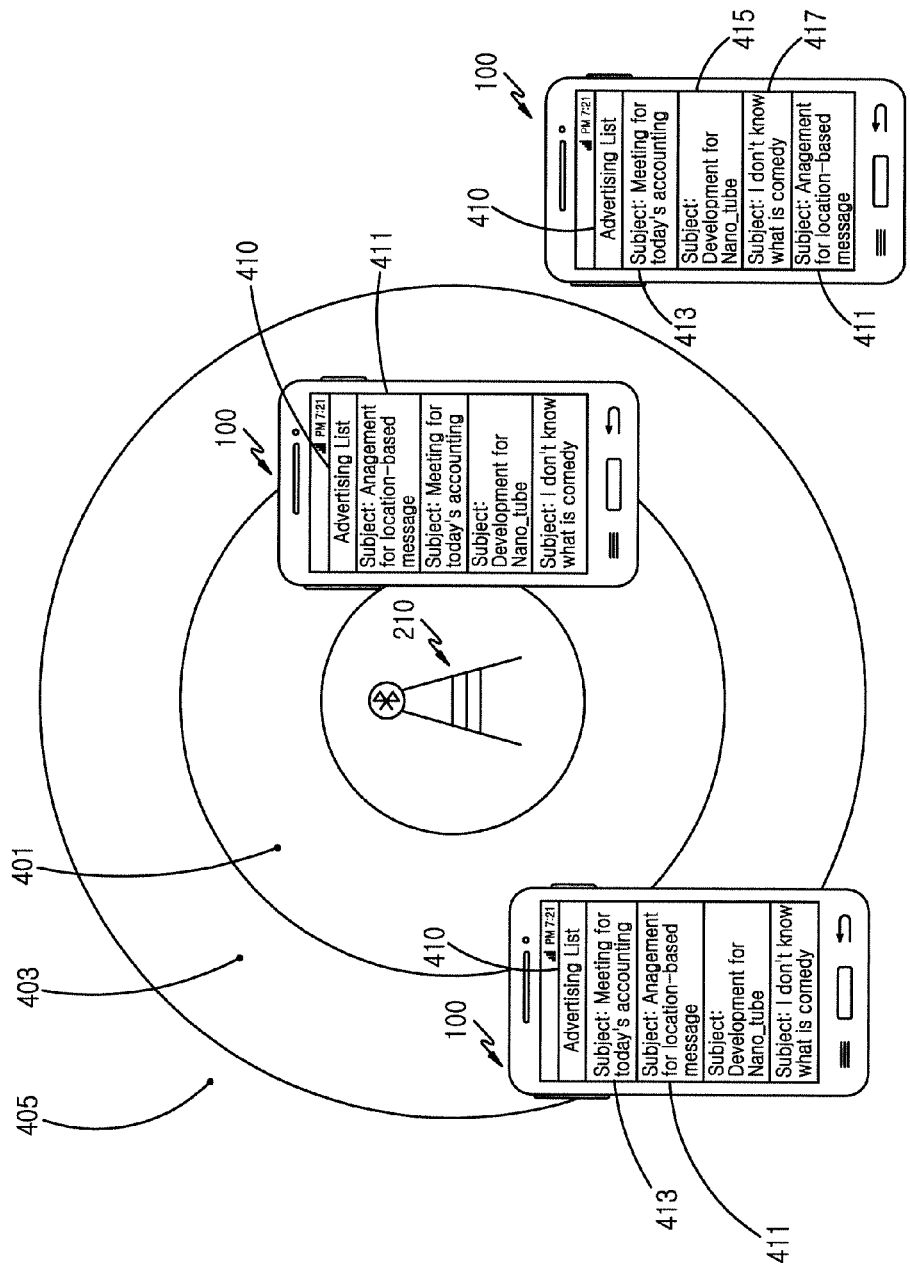
FIGS. 4A and 4B illustrate an example of data information display in the electronic device according to this disclosure.
Figure 4B:
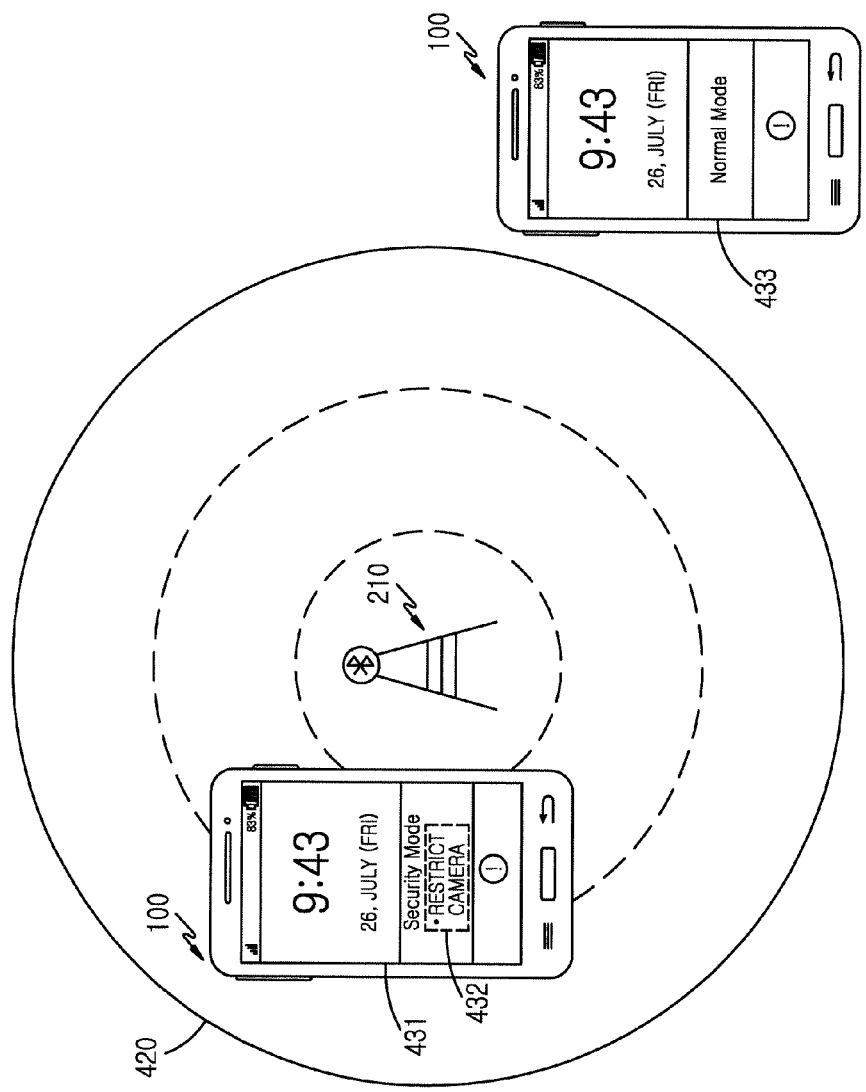

FIGS. 4A and 4B depict example operations for displaying data information in the electronic device according to this disclosure. The electronic device 100 displays one or more information contained in the control information of the data received from the data transmitter 210. The electronic device 100 processes the operation corresponding to the event information or the control information of the data received from the data transmitter 2 according to the distance to the data transmitter 210 obtained from the short-range radio communication signal strength in relation to the data transmitter 210. For example, the operation corresponding to the event information or the control information includes one or more of coupon download, bell sound setting, vibration mode ON/OFF, and Wi-Fi ON/OFF. Further, the electronic device 100 resets (or reconfigures) the one or more downloaded coupon or the event information according to the distance determined with the short-range radio communication signal strength, delete the coupon or the event information according to the determined distance, lower data accessibility, or move (or store) the data to a specific area therein.

As shown in FIG. 4A, the electronic device 100 compares the displayed information and displays the information by determining the priority of the information according to the location of the electronic device 100. For example, the data transmitter 210 identifies the electronic device 100 in data transmission ranges 401 through 405 and transmits data. Based on the ID information in the received data, the electronic device 100 determines whether the data transmitter 210 is approved. When the data transmitter 210 is approved, the electronic device 100 displays the event information of the received data. When displaying the received event information, the electronic device 100 determines the display priority by comparing the displayed event information and one or more event information received.

In the first range 401, the electronic device 100 displays event information 'Subject: Management for location-based message' 411 of the received data in a certain area of an advertising list 410. The electronic device 100 determines the display priority. When the display priority is higher than other event information, the electronic device 100 in the first range 401 displays the advertising list 410. To determine the display priority of the events, the electronic device 100 compares the distances to the data transmitters which transmit the data including the event information. The electronic device 100 includes information such as subject, event time, event place, or event expiration date in the displayed event information.

In the second range 403, the electronic device 100 confirms the distance change from the data transmitter 210 based on the signal strength of the data transmitter 210, and determine the priority by comparing the distances from the data transmitters sending the displayed information 'Subject: Management for location-based message' 411, the other displayed information, and the event information. When the data transmitter sending event information 'Subject: Meeting for today's accounting' 413 is closer than the data transmitter 210 sending the event information 'Subject: Management for location-based message' 411, the electronic device 100 displays the event information 'Subject: Meeting for today's accounting' 413 prior to the event information 'Subject: Management for location-based message' 411.

Out of the data transmission range of the data transmitter 210, the electronic device 100 displays the 'Subject: Management for location-based message' 411 received from the data transmitter 210 in the lower priority than other event information 'Subject: Meeting for today's accounting' 413, 'Subject: Development for Nano-tube' 415, and 'Subject: I don't know what is comedy' 417 which allow the distance measurement to the data transmitter. When not determining the distance to the data transmitter 210 which transmits the event information 'Subject: Management for location-based message' 411, the electronic device 100 releases the displayed event information 'Subject: Management for location-based message' 411 or deletes the data including the event information 'Subject: Management for location-based message' 411. The electronic device 100 stores the data including the event information 'Subject: Management for location-based message' 411 which cannot determine the distance to the data transmitter 210, in a separate area of the memory 110.

The electronic device 100 determines the distance to the data transmitter sending the event information based on, but not limited to the distance obtained based on the data signal strength of the short-range radio communication, the location obtained by a location detector such as Global Positioning System (GPS), and determine the display method (such as the display priority) of the event information based on the distance.

As shown in FIG. 4B, in the data transmission range 420 of the data transmitter 210, the electronic device 100 controls its function based on the control information of the received data. The data transmitter 210 identifies the electronic device 100 in the data transmission range 420 and transmits the data including the control information. Based on the ID information of the received data, the electronic device 100 determines whether the data transmitter 210 is approved. When the data transmitter 210 is approved, the electronic device 100 controls its function based on the control information of the received data. The electronic device 100 displays its controlled function.

In the data transmission range 420 of the data transmitter 210, the electronic device 100 controls its one or more functions based on the control information of the data received from the data transmitter 210. The electronic device 100 obtains information requesting 'Security Mode' in the received data. The electronic device 100 controls its function according to the information corresponding to 'Security Mode'. When the memory 110 contains setting information for preset function control in response to 'Security Mode', the electronic device 100 controls its function according to the setting information. The electronic device 100 obtains information about 'Restrict camera' according to 'Security Mode' and restricts the camera operation in 'Security Mode'. According to the control information of the received data, the electronic device 100 displays 'Security Mode' in a certain region 431 of the touch screen 133 in 'Security Mode'. The electronic device 100 displays the function 432 controlled in 'Security Mode'.

Out of the data transmission range 420 of the data transmitter 210, the electronic device 100 controls the function restricted by the control information of the data received from the data transmitter 210. The electronic device 100 confirms its location outside the data transmission range of the data transmitter 210 and release 'Security Mode'. The electronic device 100 removes a restriction of the camera corresponding to 'Restrict camera' based on 'Security Mode'. Outside the data transmission range 420 of the data transmitter 210, the electronic device 100 displays the release 433 of 'Security Mode'. The electronic device 100 determines, but not limited to, the display priority of the displayed event information and the priority of the control information execution.

FIGS. 5A, 5B, 5C, 5D, and 5E depict example operations for displaying data information in the electronic device according to this disclosure. The electronic device 100 compares the distance to the data transmitter sending the event information with respect to each event, and displays the information by determining the priority of the information based on the distances between the electronic device 100 and the data transmitters sending the event information. In an overlapping data transmission range of the multiple data transmitters, the electronic device 100 determines the display priority of the event information according to the location of the electronic device 100.

Figure 5A:
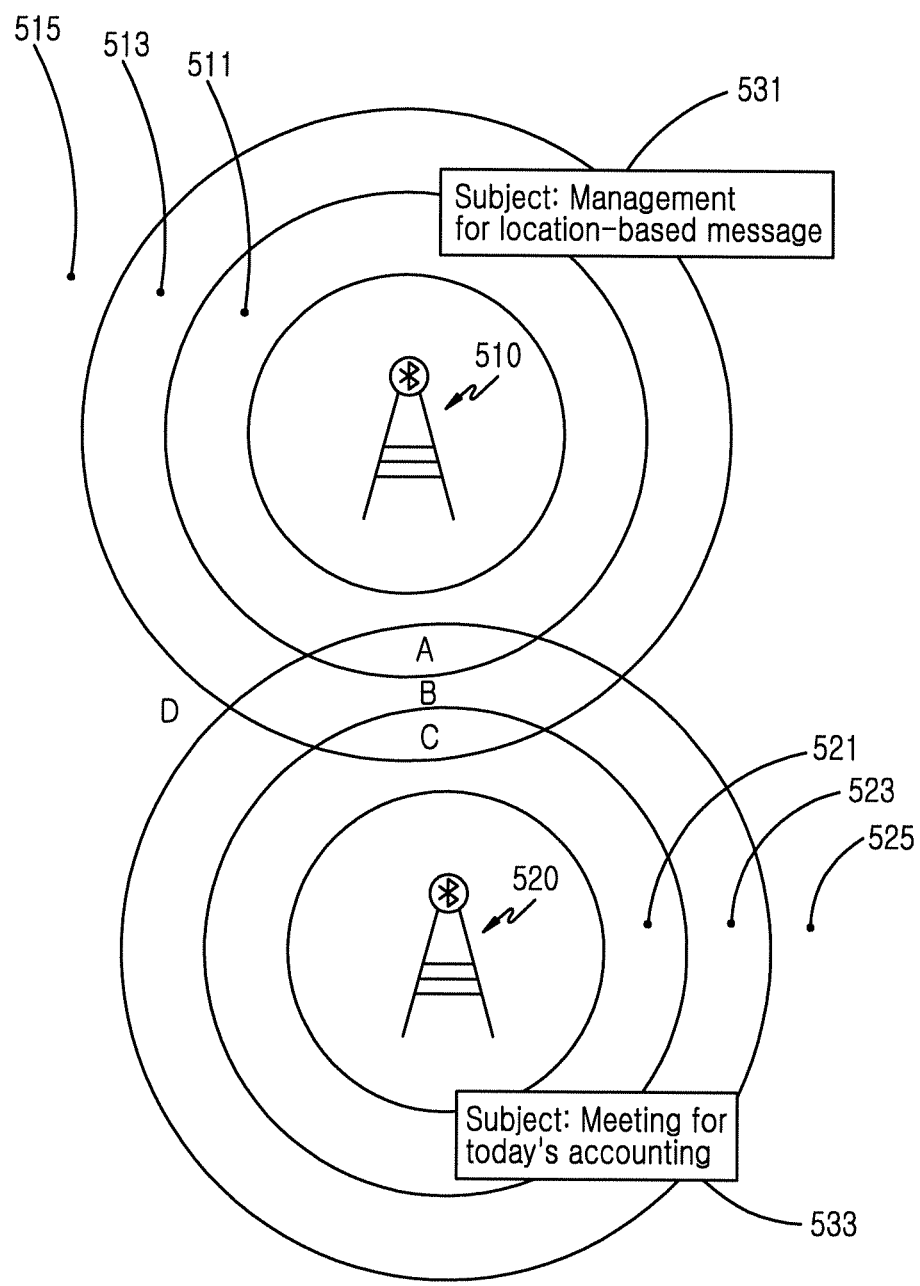
FIGS. 5A, 5B, 5C, 5D, and 5E illustrate examples of data information displays in the electronic device according to this disclosure.

As shown in FIG. 5A, in the data transmission range of the multiple data transmitters, the electronic device 100 determines the distance to the data transmitters sending the event information and determine the display priority of the event information based on the determined distances. The electronic device 100 is at A, B, or C in the overlapping data transmission range of a first data transmitter 510 and a second data transmitter 520, or at D. The first data transmitter 510 identifies the electronic device 100 in data transmission ranges 511 through 515 and sends data including event information 'Subject: Management for location-based message' 531. The second data transmitter 520 identifies the electronic device 100 in data transmission range 521 through 525 and sends data including event information 'Subject: Meeting for today's accounting' 533. The electronic device 100 determines its location (such as A, B, C, or D) in the data transmission range including the first range 511, the second range 513, or the third rage 515 of the first data transmitter 510 and the in the data transmission range including the fourth rage 521, the fifth range 523, or the sixth rage 525 of the second data transmitter 520. The data transmission ranges (the first range through the sixth range) of the data transmitters is determined based on the distance to the first data transmitter 510 or the second data transmitter 520 as determined by the electronic device 100.

Figure 5B:
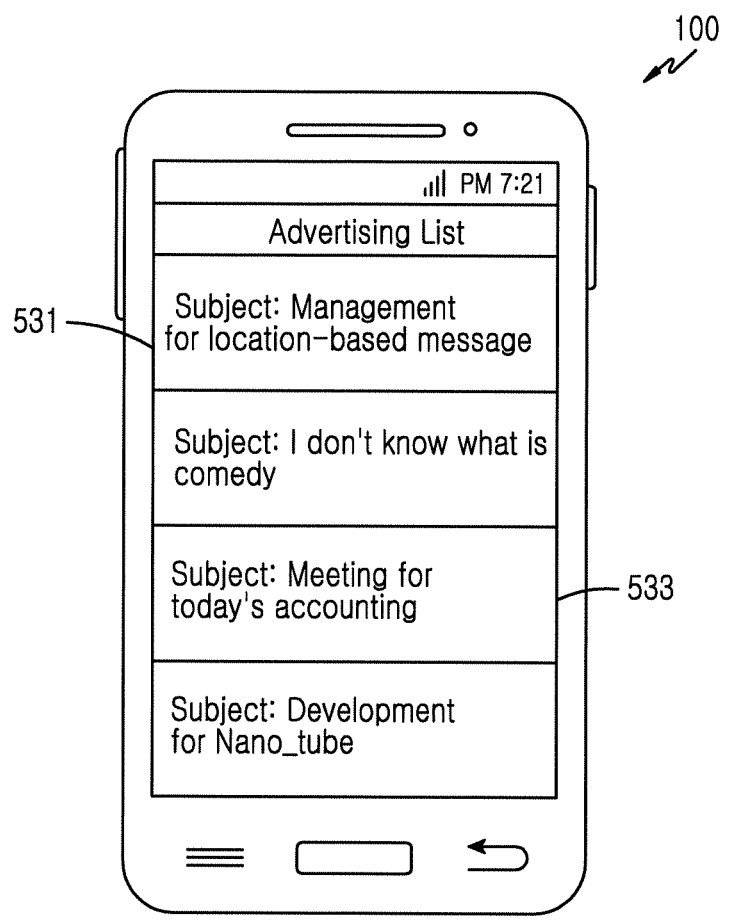

As shown in FIG. 5B, the electronic device 100 at the A of FIG. 5A determines the display priority of the event information 'Subject: Management for location-based message' 531 and the event information 'Subject: Meeting for today's accounting' 533 based on the distance information of the first data transmitter 510 and the second data transmitter 520. At the A, the electronic device 100 determines its location in the first range 511 of the first data transmitter 510 and the firth range 523 of the second data transmitter 520. The electronic device 100 determines that the distance to the first data transmitter 510 is shorter than the distance to the second data transmitter 520. The electronic device 100 gives the higher display priority to the event information 'Subject: Management for location-based message' 531 of the data received from the first data transmitter 510 than the event information 'Subject: Meeting for today's accounting' 533 of the data received from the second data transmitter 520, and display the event information 'Subject: Management for location-based message' 531 higher than the event information 'Subject: Meeting for today's accounting' 533 according to the display priority in the advertising list displaying the event information of the electronic device 100.

Figure 5C:
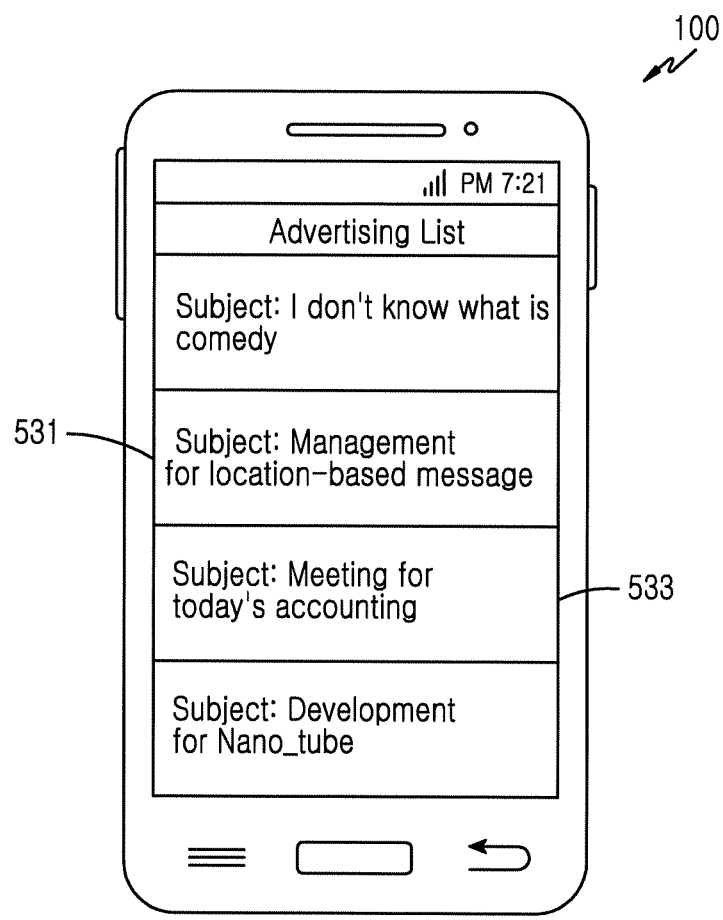

As shown in FIG. 5C, the electronic device 100 at the B of FIG. 5A determines the display priority of the event information 'Subject: Management for location-based message' 531 and the event information 'Subject: Meeting for today's accounting' 533 based on the distance information of the first data transmitter 510 and the second data transmitter 520.

At the B, the electronic device 100 determines its location in the second range 513 of the first data transmitter 510 and the firth range 523 of the second data transmitter 520. The electronic device 100 determines that the distance to the first data transmitter 510 is equal to or different from, within a preset error range, the distance to the second data transmitter 520. The electronic device 100 gives the equal display priority to the event information 'Subject: Management for location-based message' 531 of the data received from the first data transmitter 510 and the event information 'Subject: Meeting for today's accounting' 533 of the data received from the second data transmitter 520. When displaying the event information in the advertising list, the electronic device 100 confirms the distance difference of the data transmitters and gives the higher priority to the event information of the shorter distance difference. When displaying the event information in the advertising list, the electronic device 100 determines the display priority of the event information based on one or more of event reliability information, recommendation information, usage information, event time, event place, and event expiration date in the database of the electronic device 100 or in the data received from the other electronic device. The electronic device 100 displays the event information 'Subject: Management for location-based message' 531 and the event information 'Subject: Meeting for today's accounting' 533 in the advertising list of the event information according to the display priority.

Figure 5D:
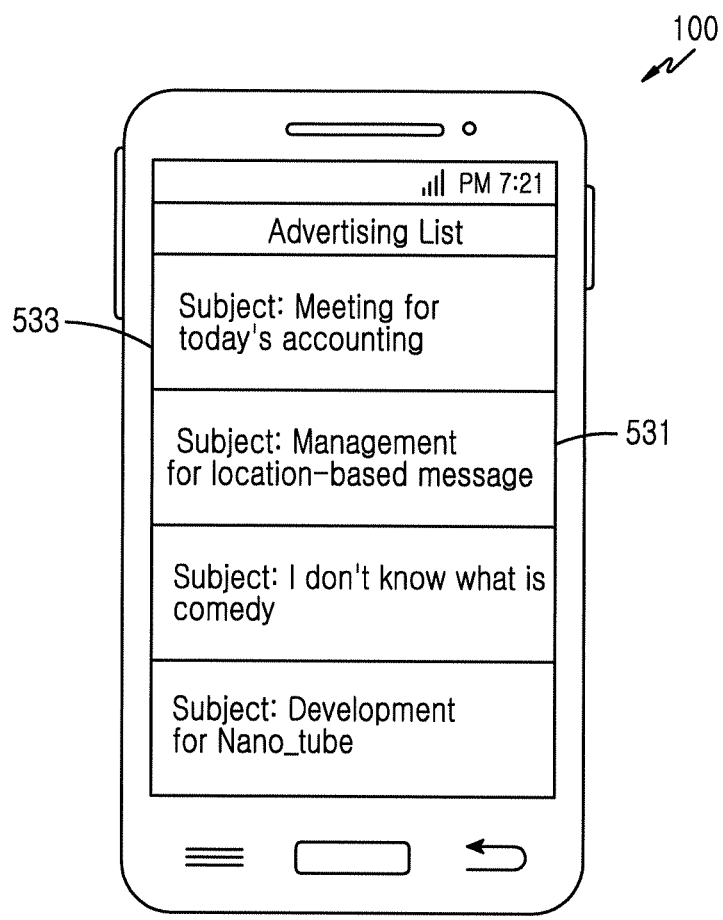

As shown in FIG. 5D, the electronic device 100 at the C of FIG. 5A determines the display priority of the event information 'Subject: Management for location-based message' 531 and the event information 'Subject: Meeting for today's accounting' 533 based on the distance information of the first data transmitter 510 and the second data transmitter 520. At the C, the electronic device 100 determines its location in the second range 513 of the first data transmitter 510 and the fourth range 521 of the second data transmitter 520. The electronic device 100 determines that the distance to the first data transmitter 510 is longer than the distance to the second data transmitter 520. The electronic device gives the lower display priority to the event information 'Subject: Management for location-based message' 531 of the data received from the first data transmitter 510 than the event information 'Subject: Meeting for today's accounting' 533 of the data received from the second data transmitter 520. According to the display priority, the electronic device 100 displays the event information 'Subject: Meeting for today's accounting' 533 higher than the event information 'Subject: Management for location-based message' 531 in the advertising list displaying the event information.

Figure 5E:
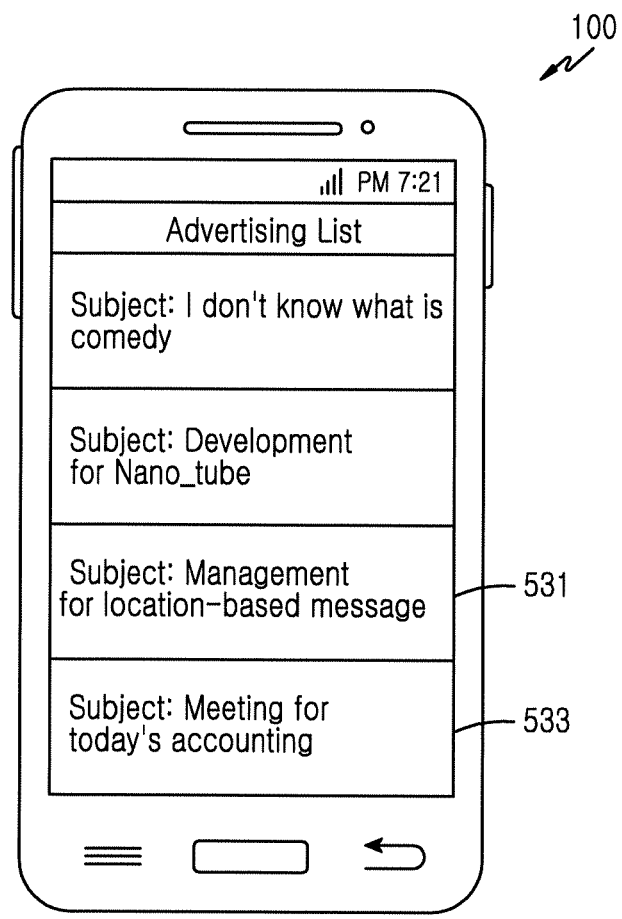

As shown in FIG. 5E, the electronic device 100 at the D of FIG. 5A determines the display priority of the event information 'Subject: Management for location-based message' 531 and the event information 'Subject: Meeting for today's accounting' 533 based on the distance information of the first data transmitter 510 and the second data transmitter 520. At the D, the electronic device 100 determines its location in the third range 515 of the first data transmitter 510 and the sixth range 525 of the second data transmitter 520. Out of the data transmission ranges of the first data transmitter 510 and the second data transmitter 520, the electronic device 100 determines the short-range radio communication disconnection from the first data transmitter 510 and the second data transmitter 520. When displaying the event information in the advertising list, the electronic device 100 gives the higher priority to event information received from other data transmitted connected using the short-range radio communication, than the event information 'Subject: Management for location-based message' 531 and the event information 'Subject: Meeting for today's accounting' 533. When not determining the distance to the data transmitter 210 sending the event information 'Subject: Management for location-based message' 411, the electronic device 100 releases the displayed event information 'Subject: Management for location-based message' 531 and event information 'Subject: Meeting for today's accounting' 533 and/or delete the data including the event information 'Subject: Management for location-based message' 531 and the event information 'Subject: Meeting for today's accounting' 533. The electronic device 100 stores in a separate area of the memory 110 the data including the event information 'Subject: Management for location-based message' 531 and the event information 'Subject: Meeting for today's accounting' 533 of the undetermined distance to the data transmitter 210.

FIG. 6 depicts example operations for displaying data information in the electronic device according to this disclosure. The electronic device 100 determines the display priority of the event information of the data received from one or more data transmitters, based on one or more of the location information of the electronic device 100, the event reliability information, the recommendation information, the usage information, the event time, the event place, and the event expiration date.

Referring to FIG. 6A, the electronic device 100 displays the event information based on the determined display priority. The electronic device 100 determines the display priority of one or more event information, based on the expiration date. The electronic device 100 gives the high display priority to the event information of the early expiration date. The electronic device 100 determines that event information 'Subject: Auto show 15% D/C' 611 is overdue (such as 2013. 07. 07) in an advertising list 603, and give the lower display priority to the overdue event information than the unexpired event information.

The electronic device 100 determines the display priority of the event information based on the expiration date and the location of the electronic device 100. In the advertising list 603, the expiration date (such as 2013. 07. 26) of event information 'Subject: Management for location-based message' 607 is earlier than the expiration date (such as 2013. 07. 27) of event information 'Subject: JJang World 90% D/C' 605, the data transmitter sending the data including the event information 'Subject: Management for location-based message' 607 is in 'Busan', and the data transmitter sending the data including the event information 'Subject: JJang World 90% D/C' 605 is in 'Seoul'. The electronic device 100 confirms its location in 'Seoul' and determines the display priority of the event information based on its location above the expiration date. The electronic device 100 displays the event information 'Subject: JJang World 90% D/C' 605 received from the data transmitter relatively closer, with the higher priority than the event information 'Subject: Management for location-based message' 607. To determine the location of one or more data transmitters, the electronic device 100 obtains location information from data transmitted and received in the connected short-range radio communication, obtain the location information using the GPS, and obtain its location using other methods (such as obtain the location information from data received from a base station). The electronic device 100 determines the display priority of the event information using the reliability information of the data transmitter sending the event information or the event information, and the recommendation information in the data received at the electronic device 100 and/or other electronic device.

Referring to FIG. 6B, the electronic device 100 changes the event information displayed based on the determined display priority. When determining the display priority of one or more event information, the electronic device 100 changes the display priority based on the expiration date. When the expiration date (such as 2013. 07. 26) of the event information 'Subject: Management for location-based message' 607 is expired in an advertising list 703, the electronic device 100 displays the expired event information below the unexpired event information in the display priority. The electronic device 100 releases the displayed expired event information 'Subject: Management for location-based message' 607 and the event information 'Subject: Auto show 15% D/C' 611 and/or delete the data including the event information 'Subject: Management for location-based message' 607 and the event information 'Subject: Auto show 15% D/C' 611. The electronic device 100 stores in a separate area of the memory 110 the data including the expired event information 'Subject: Management for location-based message' 607 and the event information 'Subject: Auto show 15% D/C' 611.

When changing the display priority in the advertising list 703, the electronic device 100 determines the display priority based on, but not limited to, the location information of the electronic device 100 or the event expiration date and various comparable information such as reliability information, recommendation information, usage information, and event time of the data.

FIG. 7 depicts example operations for determining an order of the data information in the electronic device according to an exemplary embodiment of the present disclosure. The electronic device 100 determines the display priority of the event information displayed on the touch screen based on not only the information in the database of the memory 110 but also the information of data received from other electronic device such as server 710. The electronic device 100 changes the display priority of the displayed event information and the priority of the data transmitter 210 sending the event information. When changing the priority of the data transmitter 210, the electronic device 100 changes the display priority of the event information data received from the data transmitter 210.

The electronic device 100 receives the data including the event information from the data transmitter 210. Based on the ID information of the data transmitter 210 in the received data, the electronic device 100 determines whether the data includes the event information approved or displayable by the electronic device 100. The electronic device 100 compares the ID information of the data transmitter 210 of the data with reliability information (or list) 720 of the data transmitter in the database. Referring to FIG. 7A, the electronic device 100 sets the reliability of the data transmitter 210 to $77^{th}$ based on the ID information in the data received from the data transmitter 210 and the reliability information 720 of the data transmitter in the database. The electronic device 100 receives the reliability information of the data transmitter from other electronic device in the network communication. The electronic device 100 re-determines the reliability of the data transmitter 210 by referring to the reliability information 720 of the data transmitter in the database and the received reliability information of the data transmitter. Based on the reliability information 720 of the data transmitter and the received reliability information of the data transmitter, the electronic device 100 updates the reliability information of the data transmitter of the database with the received reliability information of the data transmitter. Referring to FIG. 7B, the electronic device 100 resets (or reconfigures) the reliability of the data transmitter 210 to 49th based on the ID information of the data transmitter 210 and the updated reliability information 730 of the data transmitter of the database. The electronic device 100 re-determines the display priority of the displayed event information according to the reliability of the data transmitter sending the event information. The electronic device 100 updates the reliability information with respect to the data transmitter and the event information, and re-determines the display priority of the event information according to the updated reliability information.

The electronic device 100 changes the display priority in the advertising list 703 based on, but not limited to the reliability of the data transmitter and/or the event information, various comparable information such as recommendation information of the data transmitter and/or the event information, usage information, event time, event average score, location of the data transmitter sending the event information, discount rate of a discount coupon, event expiration date (includes the time), or preset condition received from the server 710 or the other electronic device connected to Social Networking Service (SNS). Based on the reliability information 730 of the database, the electronic device 100 deletes the event information corresponding to the determined priority of the event information displayed in the touch screen 133. When deleting the event information, the electronic device 100 may not delete one or more event information designated by the user even when they are to be deleted based on the determined priority.

Figure 8:
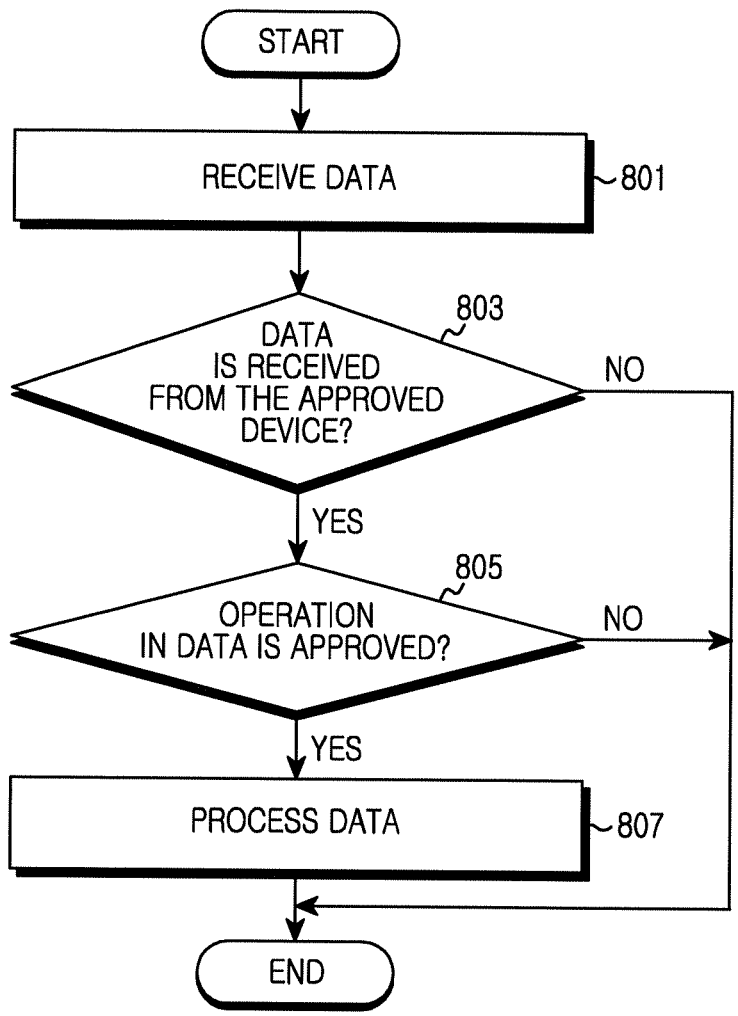
FIG. 8 illustrates example operations for displaying received event information in the electronic device according to this disclosure.

FIG. 8 is an example flowchart of operations for displaying the received event information in the electronic device according to this disclosure. The electronic device 100 receives the event information from the data transmitter. When the database of the electronic device 100 stores the approved ID information of the data transmitter, the electronic device 100 operates according to the approved event information.

In step 801, the electronic device 100 receives the data from the data transmitter connected through the short-range radio communication. The electronic device 100 receives the data from the data transmitter connected using Bluetooth. The received data of the electronic device 100 includes one or more of the ID information of the data transmitter, the event information, and the operation control information. In step 803, the electronic device 100 determines whether the data is received from the data transmitter approved to process the received data. The electronic device 100 determines whether the ID information of the data transmitter in the received data is stored in the database of the electronic device 100. When confirming the ID information of the data in the database, the electronic device 100 confirms the event information or the operation control information in the data. When not confirming the ID information of the data in the database, the electronic device 100 finishes this process of FIG. 8.

In step 805, the electronic device 100 determines whether the event information or the operation control information of the received data is approved to be processed in the electronic device 100. The electronic device 100 confirms its one or more controllable functions in the information of the database, and determines whether the event information or the operation control information of the received data is included in the one or more controllable function information in the database. When not being able to process the event information or the operation control information of data, the electronic device 100 finishes this process of FIG. 8.

In step 807, the electronic device 100 processes the data according to the event information or the operation control information of the received data. The electronic device 100 displays the event information of the received data and one or more other event information. The electronic device 100 determines the priority to display the one or more event information, and display the event information according to the determined priority. The electronic device 100 determines the display priority by comparing various comparable information such as reliability information of the data transmitter and/or the event information, recommendation information of the data transmitter and/or the event information received from the server 710 or the other electronic device connected to the SNS, usage information, event time, event average score, location of the data transmitter sending the event information, discount rate of the discount coupon, event expiration date (including the time), or preset condition.

The electronic device 100 controls its one or more functions according to the operation control information of the received data. The data received from the data transmitter includes information requesting to restrict one or more functions of the electronic device 100. The electronic device 100 determines whether the ID information of the data transmitter sending the data and the function control request information of the data are approved by the electronic device 100. The electronic device 100 operates in a preset mode according to a prearranged command with the data transmitter. Next, the electronic device 100 finishes the process of FIG. 8.

Figure 9:
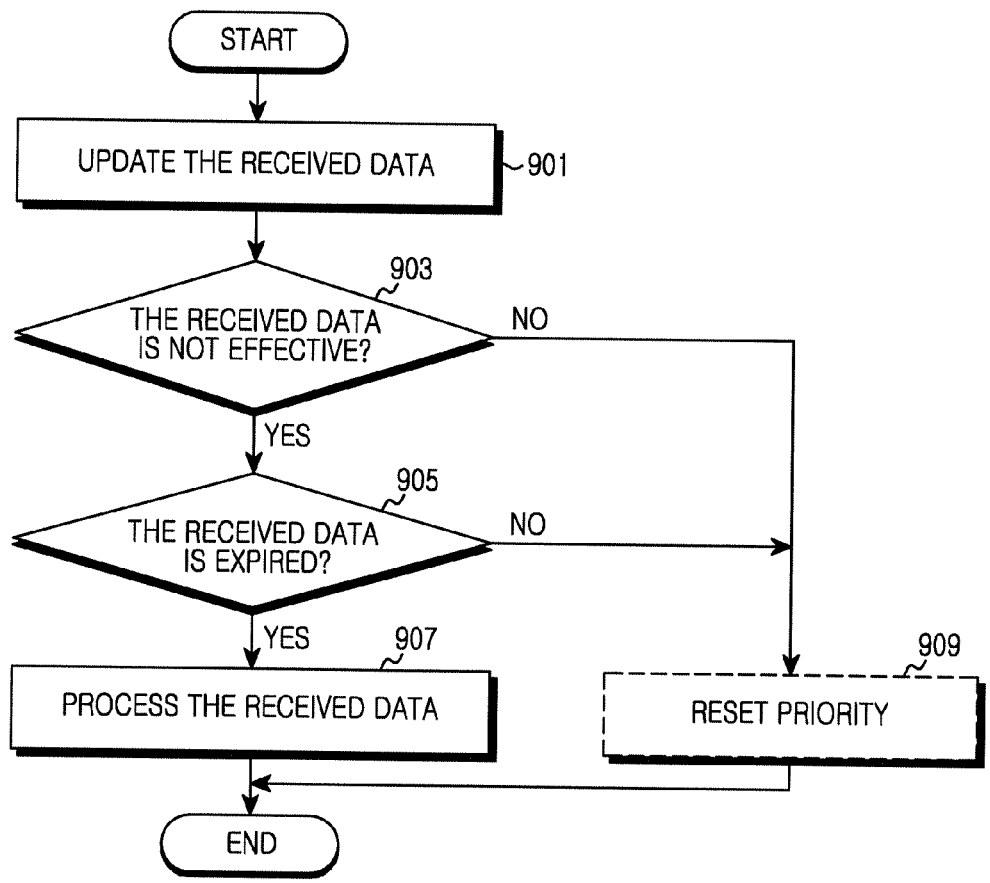
FIG. 9 illustrates example operations for displaying the received event information in the electronic device according to this disclosure.

FIG. 9 is a flowchart of operations for displaying the received event information in the electronic device according to an exemplary embodiment of the present disclosure. The electronic device 100 updates the displayed event information or the executed control information, determines whether it is located in the range corresponding to the respective information, determines whether each information set passes the expiration date, and re-determines the priority of the event information or the control information according to the determination.

In step 901, the electronic device 100 displays the event information of the data received from the data transmitter according to the priority. The electronic device 100 updates the received event information or the database information, and check the short-range radio communication status connected to the data transmitter sending the displayed event information. The electronic device 100 obtains the expiration date information of the displayed event information. The electronic device 100 determines whether it is in the range corresponding to the control information which controls the operation of the electronic device.

In step 903, the electronic device 100 determines whether it is located in the data transmission range of the data transmitter sending the displayed event information. In the data transmission range of the data transmitter sending the displayed event information, the electronic device 100 proceeds to step 909. Outside the data transmission range, the electronic device 100 proceeds to step 905. In step 905, the electronic device 100 compares the event expiration date with the time of the electronic device 100 according to the displayed event information. When the event expiration date is expired based on the time of the electronic device 100, the electronic device 100 goes to step 907. When the event expiration date is not expired, the electronic device 100 goes to step 909.

In step 907, the electronic device 100 processes the displayed event information according to the determinations of step 903 and step 905. Out of the short-range radio communication range connected to the data transmitter sending the displayed event information, the electronic device 100 changes the display priority of the event information. The electronic device 100 changes the display priority of the event information to the lower priority, and moves the data including the event information to a separate area of the memory 110. When the event expiration date of the displayed event information is expired, the electronic device 100 changes the display priority of the event information to the lower priority, and moves the data including the event information to a separate area of the memory 110. The electronic device 100 determines the short-range radio communication connection status or the event expiration date and determines to process the data including the event information. The electronic device 100 applies the received data processing to not only the event information but also the control information for controlling one or more functions.

In step 909, the electronic device 100 updates the reliability information of the data transmitter sending the event information and/or the event information, and re-determine the display priority of the event information according to the updated reliability information. The electronic device 100 changes the display priority of the displayed event information based on, but not limited to, the reliability of the data transmitter and/or the event information. The electronic device 100 re-determines the display priority based on various comparable information such as recommendation information of the data transmitter and/or the event information received from the server 710 or the other electronic device connected to the SNS, usage information, event time, event average score, location of the data transmitter sending the event information, discount rate of the discount coupon, event expiration date (including the time), category-based classification information, or preset condition.

A method for operating a first electronic device includes receiving data from a second electronic device in short-range radio communication; detecting a location of the first electronic device; and determining an execution method of the received data based on the location of the electronic device and one or more of communication region information of the short-range radio communication of the second electronic device, signal strength of the short-range radio communication in the communication region, and location information of the electronic device. A method for operating an electronic device includes receiving event information from other electronic device in short-range radio communication, determining a location of the electronic device, and determining an execution method of the event information based on one or more of communication region information of the short-range radio communication of the other electronic device and location information of the electronic device.

The determining of the execution method includes determining a display priority of the received event information. The method further includes disconnecting the short-range radio communication, and deleting the received event information. The disconnecting of the short-range radio communication includes leaving the short-range radio communication range. The deleting is performed when the short-range radio communication is disconnected based on distance information of the other electronic device. The execution method is determined based on one or more of the communication region information of the other electronic device, the location information of the electronic device, and date information.

The method further includes, after receiving the data, determining to delete the event information based on one or more of reliability of the other electronic device, reliability of the event information, and reliability of operation control information received from the other electronic device. The reliability is determined based on one or more of the number of communications of a third electronic device which recommends the event information reception, the number of recommendations for the data obtained in network communication, reliability of the other electronic device which sends the data, and physical distance information of the electronic device and the other electronic device. The reliability of the other electronic device, the reliability of the data, and the reliability of the operation control information is updated based on the reliability of the other electronic device, the reliability of the data, and the reliability of the operation control information received from a fourth third electronic device.

The short-range radio communication includes one or more of Infrared Data Association (IrDA) communication, Bluetooth communication including Bluetooth Low Energy (BLE) communication, Wireless Fidelity (Wi-Fi) communication, Near Field Communication (NFC) communication, Zigbee communication, and ANT+ communication.

The method further includes, after receiving the data, classifying the received data based one or more preset categories; and determining event information corresponding to the one or more preset categories. The category is determined based on one or more of reliability information of a data transmitter sending the event information or the event information, recommendation information of the data transmitter or the data received from a server or other electronic device connected to a Social Networking Service (SNS), usage information of the event information, event time information, location information of the data transmitter sending the event information, discount rate information when the event information is a discount coupon, and event expiration date information.

When processing the received data, the electronic device determines data importance based on the reliability. When displaying or arranging the event information of the received data, the electronic device displays or arranges the event information first corresponding to the region of the electronic device. The electronic device performs various operations according to a request of the data based on the data received in the short-range radio communication service coverage and the location information of the electronic device.

The present operation is executed by one or more programs in the memory 110 of the electronic device 100, controlled directly by the processor, and controlled by the data management module instructed by the processor. The data management module performs at least one of functions of the message management program 116 and is controlled by the processor. The electronic device 100 controls the data management module to receive the data including one or more of the event information, the control information, and the ID information for identifying the other electronic device from the other electronic device through the processor 122, and to perform at least one function corresponding to at least part of the received data.

A first electronic device includes a display for displaying one or more data; a memory for storing the data; a data management module for receiving data from a second electronic device in short-range radio communication, detecting a location of the first electronic device, and determining an execution method of the received data based on at least one of the location of the electronic device and one or more of communication region information of the short-range radio communication of the second electronic device, signal strength of the short-range radio communication in the communication region, and location information of the electronic device; and one or more processors for controlling the data management module.

An electronic device includes a touch screen for displaying one or more event information; a memory for storing the event information; a data management module for managing the event information; and one or more processor for running the data management module. The data management module controls to receive the event information from other electronic device in short-range radio communication, to determine a location of the electronic device, and to determine an execution method of the event information based on one or more of communication region information of the short-range radio communication of the other electronic device and location information of the electronic device.

The data management module controls to determine the execution method based on a display priority of the received event information. The data management module controls to disconnect the short-range radio communication and to delete the received event information. When the electronic device leaves the short-range radio communication range, the data management module controls to disconnect the short-range radio communication. When the short-range radio communication is disconnected based on distance information of the other electronic device, the data management module controls to delete the event information.

The data management module controls to determine the execution method based on one or more of the communication region information of the other electronic device, the location information of the electronic device, and date information. The data management module controls to determine to delete the event information based on one or more of reliability of the other electronic device, reliability of the event information, and reliability of operation control information received from the other electronic device. The data management module controls to determine the reliability based on one or more of the number of communications of a third electronic device which recommends the event information reception, the number of recommendations for the data obtained in network communication, reliability of the other electronic device which sends the data, and physical distance information of the electronic device and the other electronic device. The data management module controls to update the reliability of the other electronic device, the reliability of the data, and the reliability of the operation control information based on the reliability of the other electronic device, the reliability of the data, and the reliability of the operation control information received from a fourth third electronic device.

The data management module controls to connection the short-range radio communication using one or more of Infrared Data Association (IrDA) communication, Bluetooth communication including Bluetooth Low Energy (BLE) communication, Wireless Fidelity (Wi-Fi) communication, Near Field Communication (NFC) communication, Zigbee communication, and ANT+ communication.

The data management module controls to classify the received data based one or more preset categories and to determine event information corresponding to the one or more preset categories. The data management module controls to determine the category based on one or more of reliability information of a data transmitter sending the event information or the event information, recommendation information of the data transmitter or the data received from a server or other electronic device connected to a Social Networking Service (SNS), usage information of the event information, event time information, location information of the data transmitter sending the event information, discount rate information when the event information is a discount coupon, and event expiration date information.

While the data management module performs the operations above, they are performed under the control of the processor 120. Further, the data management module which is programmed to control embodiments of the present disclosure can be separated from the processor 120. The data management module programmed to control embodiments of the present disclosure operates under the control of the processor 120.

The methods as described in the claims or the specification of exemplary embodiments of the present disclosure can be implemented using hardware, software, or a combination of them. As for the software, a computer-readable storage medium including one or more programs (such as software modules) is provided. One or more programs stored in the computer-readable storage medium are configured for execution by one or more processors of the electronic device 100. One or more programs include instructions for controlling the electronic device 100 to execute the methods according to the exemplary embodiments as described in the claims and/or the specification of the present disclosure.

Such a program (such as a software module or software) is stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs are stored to a memory combining part or all of those recording media. A plurality of memories can be equipped.

The programs are stored in an attachable storage device of the electronic device 100 accessible via a communication network such as Internet, Intranet, Local Area Network (LAN), Wide LAN (WLAN), or Storage Area Network (SAN), or a communication network by combining these networks. The storage device accesses the electronic device 100 through an external port. A separate storage device accesses the mobile electronic device 100 over a communication network.

While the disclosure has been shown and described with reference to certain exemplary embodiments thereof, it will be understood by those skilled in the art that various changes in form and details are made therein without departing from the spirit and scope of the disclosure as defined by the appended claims and their equivalents.

What is claimed is:

1. A method to operate a first electronic device, the method comprising:
    determining an execution method of data received from a second electronic device using short-range radio communication based on at least one of:
        i) a location of the first electronic device and one or more communication region information sets of the short-range radio communication of the second electronic device,
        ii) a signal strength of the short-range radio communication in a communication region, and
        iii) location information of the first electronic device; and
    processing the received data according to the determined execution method,
    wherein determining the execution method comprises determining a display priority or an arrangement priority of the received data, and
    wherein the received data comprises at least one of: one or more event information sets or one or more operation control information sets.

2. The method of claim 1, wherein the received data further comprises at least a part of an Identification (ID) code of the second electronic device.

3. The method of claim 1, wherein the received data comprises one or more event information sets associated with calendar events for a user of the first electronic device.

4. The method of claim 1, further comprising:
    when detecting a disconnection of the short-range radio communication, deleting the received data or lowering an accessibility of the data.

5. The method of claim 1, wherein the execution method is determined based on one or more of the communication region information of the second electronic device, the signal strength of the short-range radio communication in the communication region, the location information of the first electronic device, or date information.

6. The method of claim 1, further comprising:
    lowering data accessibility or deleting the data based on one or more of a reliability of the other electronic device, a reliability of the data, or a reliability of operation control information received from the other electronic device.

7. The method of claim 6, wherein the reliability is determined based on one or more of a number of communications between a third electronic device that recommends the data reception and the first electronic device, a number of recommendations for the data obtained in network communication, a reliability of the second electronic device that sends the data, or physical distance information of the first electronic device and the second electronic device.

8. The method of claim 7, wherein one or more of the reliability of the second electronic device, the reliability of the data, or the reliability of the operation control information are updated based on one or more of the reliability of the second electronic device, the reliability of the data, or the reliability of the operation control information received from the third electronic device.

9. The method of claim 1, further comprising:
classifying the received data based on one or more preset categories; and
determining data corresponding to the one or more preset categories.

10. The method of claim 9, wherein the one or more preset categories are determined based on one or more of a reliability information of a data transmitter sending the data or the data, recommendation information of the data transmitter or the data received from a server or a third electronic device which is connected to a Social Networking Service (SNS), usage information of the data, event time information, location information of the data transmitter sending the data, discount rate information when the data is a discount coupon, or event expiration date information.

11. A first electronic device comprising one or more processors configured to:
determine an execution method of data received from a second electronic device using short-range radio communication based on at least one of:
i) a location of the first electronic device and one or more communication region information sets of the short-range radio communication of the second electronic device,
ii) a signal strength of the short-range radio communication in a communication region, and
iii) location information of the first electronic device; and
process the received data according to the determined execution method,
wherein the one or more processors are configured to determine the execution method by determining a display priority or an arrangement priority of the received data, and
wherein the received data comprises at least one of: one or more event information sets or one or more operation control information sets.

12. The first electronic device of claim 11, wherein the received data further comprises at least a part of an Identification (ID) code of the second electronic device.

13. The first electronic device of claim 11, wherein the received data comprises one or more event information sets associated with calendar events for a user of the first electronic device.

14. The first electronic device of claim 11, wherein, when the short-range radio communication is disconnected, the one or more processors are configured to delete the received data or lower accessibility of the data.

15. The first electronic device of claim 11, wherein the one or more processors are configured to determine the execution method based on one or more of the communication region information of the second electronic device, the signal strength of the short-range radio communication in the communication region, the location information of the first electronic device, or date information.

16. The first electronic device of claim 11, wherein the one or more processors are configured to lower data accessibility or delete the data based on one or more of a reliability of another electronic device, a reliability of the data, or a reliability of operation control information received from the other electronic device.

17. The first electronic device of claim 16, wherein the one or more processors are configured to determine a reliability of the data based on one or more of a number of communications between a third electronic device that recommends the data reception and the first electronic device, a number of recommendations for the data obtained in network communication, a reliability of the second electronic device that sends the data, or physical distance information of the first electronic device and the second electronic device.

18. The first electronic device of claim 17, wherein the one or more processors are configured to update one or more of the reliability of the second electronic device, the reliability of the data, or the reliability of the operation control information, based on one or more of the reliability of the second electronic device, the reliability of the data, or the reliability of the operation control information received from the third electronic device.

19. The first electronic device of claim 11, wherein the one or more processors are configured to classify the received data based on one or more preset categories, and determine a data reliability corresponding to the one or more preset categories.

20. The first electronic device of claim 19, wherein the one or more processors are configured to determine the one or more preset categories based on one or more of reliability information of a data transmitter sending the data or the data, recommendation information of the data transmitter or the data received from a server or a third electronic device connected to a Social Networking Service (SNS), usage information of the data, event time information, location information of the data transmitter sending the data, discount rate information when the data is a discount coupon, or event expiration date information.

* * * * *